United States Patent
James

(10) Patent No.: US 8,074,007 B2
(45) Date of Patent: *Dec. 6, 2011

(54) PASSIVE CLIENT-HOST DETECTION FOR CONNECTED PERIPHERALS

(75) Inventor: Nicholas John James, Milton (CA)

(73) Assignee: Psion Teklogix Inc., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,520

(22) Filed: Jan. 10, 2011

(65) Prior Publication Data

US 2011/0106983 A1 May 5, 2011

Related U.S. Application Data

(63) Continuation of application No. 12/256,044, filed on Oct. 22, 2008, now Pat. No. 7,904,627.

(60) Provisional application No. 60/981,997, filed on Oct. 23, 2007.

(51) Int. Cl.
*G06F 13/00* (2006.01)

(52) U.S. Cl. ......... 710/301; 710/302; 710/304; 713/300

(58) Field of Classification Search .......... 710/301–304; 713/300, 310
See application file for complete search history.

(56) References Cited

U.S. PATENT DOCUMENTS

| RE36,381 E | 11/1999 | Boyle | |
|---|---|---|---|
| 6,665,764 B2 | 12/2003 | Wurzburg | |
| 7,103,698 B2 * | 9/2006 | Zhang et al. | 710/303 |
| 7,519,842 B2 | 4/2009 | Chen et al. | |
| 7,584,501 B2 | 9/2009 | Stancil | |
| 7,840,740 B2 * | 11/2010 | Minoo | 710/303 |
| 7,904,627 B2 * | 3/2011 | James | 710/301 |
| 2002/0169913 A1 * | 11/2002 | Heizer et al. | 710/302 |
| 2006/0015670 A1 | 1/2006 | Cinkler et al. | |
| 2007/0156942 A1 | 7/2007 | Gough | |
| 2007/0266194 A1 * | 11/2007 | Hahn et al. | 710/302 |
| 2009/0063877 A1 | 3/2009 | Lewis et al. | |

* cited by examiner

*Primary Examiner* — Glenn A Auve
(74) *Attorney, Agent, or Firm* — Pearne & Gordon LLP

(57) ABSTRACT

A client-host detection device for detecting connecting a connected peripheral is disclosed herein. The device comprises a peripheral sensor connected to a terminal, a terminal sensor connected to or for connection to a peripheral and a terminal electrical connector connected to the terminal for electrical connection with a peripheral electrical connector connected to a peripheral. The peripheral sensor is positioned to sense the terminal sensor upon connection of the terminal electrical connector with the peripheral electrical connector. The device allows for an electrical connector to be maintained in an unpowered state unless a peripheral is connected thereby reducing or preventing de-plating of the contacts of the electrical connector caused by conductive solution across the contacts as a result of the voltage on the connections. The device also allows for the use of an unpowered peripheral.

20 Claims, 2 Drawing Sheets

PASSIVE CLIENT-HOST DETECTION FOR CONNECTED PERIPHERALS

FIELD OF INVENTION

The invention relates to a device and method of detecting a peripheral connected to a terminal and more specifically to a device and method of detecting unpowered peripherals connected to a terminal.

BACKGROUND

Electronic peripherals connect to terminals via a connection interface comprising electrical connector. A peripheral connector mates with a terminal connector to complete the electrical connection. Typically a pin connector is used for making the electrical connection from the peripheral to the terminal. The terminal connector may be, for example, one of either a pin connector or a socket connector which mates with a suitable connector on the peripheral thereby allowing for interface between the terminal and the peripheral.

Typically, power is constantly provided to the terminal connector so that when a peripheral is connected to the terminal, power is provided to the peripheral via the connection. When the peripheral is a powered device, i.e. does not require the power from the terminal to operate but is either independently powered or receives power from a supply other than the terminal, it is unnecessary to constantly provide power to the electrical connector on the terminal. However, if the peripheral is unpowered, as is becoming common, power to the peripheral must be supplied for the peripheral to operate. It is therefore typical to have an arrangement wherein power is constantly supplied to the electrical connection thereby allowing for either powered or unpowered peripherals to be connected.

A problem associated with such an arrangement is the de-plating (reverse electroplating) of the contacts of the terminal connector. The de-plating is due to an accumulation of a conductive solution across the contacts through which a current runs as a result of the constantly supplied voltage. The conductive solution may be for example sweat, condensation, rain, etc. This can damage the contacts or even destroy them. To avoid this problem, power to the connector must be turned off. However, turning off the voltage to the electrical connection means that the terminal cannot detect unpowered peripherals that are attached.

A further problem associated with having a terminal connector constantly powered is the danger associated with exposing the powered terminal connector to a hazardous environment wherein a spark caused, for example by connecting a peripheral, puts the user at risk. For example, the environment may contain flammable gas or material such as hydrogen, sawdust, high oxygen concentration, gasoline, etc. In such an environment, a user must remember to power down the terminal or the connector.

A need therefore exists to provide a device that allows for use of an unpowered peripheral while preventing the contacts from being de-plated.

SUMMARY

A detector is used to detect the connection of a peripheral to a terminal. The detector has a sensor on the terminal, referred to as a peripheral sensor, and a tag on the peripheral, referred to as a terminal sensor. The two sensors are adapted such that upon connection of the peripheral to the terminal, the terminal sensor detects the presence of the peripheral sensor and the terminal sends power to the associated electrical connection thereby powering the peripheral. Such a detector device allows for the electrical connector on the terminal to be unpowered when a peripheral is not detected and eliminates the problem of de-plating of the contact of the electrical connector. The detector may be a passive detector or a powered detector.

One illustrative embodiment provides for a peripheral sensor device for sensing the presence of a peripheral, the device comprising:
a peripheral sensor connected to a terminal;
a terminal sensor connected to a peripheral;
a terminal electrical connector connected to the terminal for electrical connection with a peripheral electrical connector connected to the peripheral permitting at least one way communication between the terminal and the peripheral or power to be transmitted from the terminal to the peripheral;
the peripheral sensor positioned to sense the terminal sensor upon connection of the terminal electrical connector with the peripheral electrical connector.

Another illustrative embodiment provides for a method of reducing de-plating on a terminal electrical connector for connection to a peripheral, the method comprising the steps of:
a) maintaining the terminal electrical connector in an unpowered state unless a peripheral is detected by a peripheral sensor on the terminal;
b) detecting the connection of a peripheral to the terminal electrical connector using the peripheral sensor; and
c) supplying power to the electrical connector upon detection of the peripheral by the peripheral sensor.

DETAILED DESCRIPTION

Figure 1:
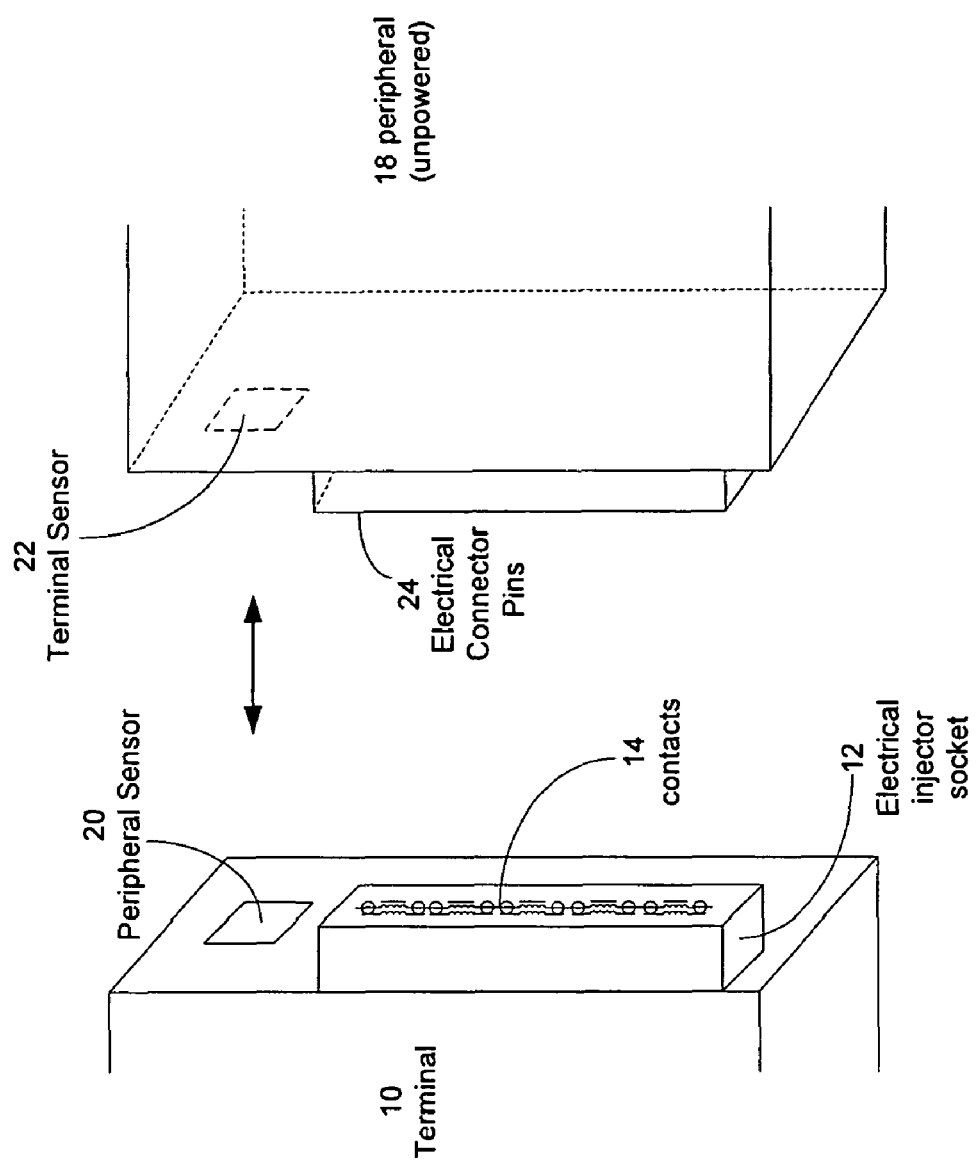
FIG. 1 is an elevational view of one illustrative embodiment of a passive detector.

A passive detector according to one embodiment is shown with reference to FIG. 1. A connection interface is shown comprising an electrical connector socket 12 for use with an electrical connector plug 24 for allowing communication between a terminal 10 and a peripheral 18. The electrical connector socket 12 is shown mounted to a terminal 10 and the electrical connector plug 24 mounted to the peripheral 18, however, it will be appreciated that either of the connector interface components may be mounted to the terminal 10 and the peripheral 18 provided that communication between the terminal 10 and the peripheral 18 is enabled by the connection to each other. In the illustrated embodiment, for example, the connector socket 12 has contacts 14 that connect to pins (not shown) of the electrical plug 24 for allowing communication between the peripheral 18 and the terminal 10. It will be appreciated that any suitable electrical connector may be used to electrically connect the terminal 10 and the peripheral 18 such that power may be provided to the peripheral via the electrical connector and that at least one-way communication between the peripheral 18 and the terminal 10 may be carried out. Other non-limiting examples of suitable connectors are printed circuit board (PCB) to pogo pins, magnetic coupling, capacitive coupling and radio frequency (RF) antenna coupling where no physical connection is used.

The passive detector comprises a peripheral sensor 20 mounted on the terminal 10. A terminal tag, referred to as a terminal sensor 22 mounted on the peripheral 18 is detectable by the peripheral sensor 20 for identifying proximity of the peripheral 18. For the purposes of this disclosure, the detector is referred to as a passive detector because power is not constantly supplied to the connection interface including the terminal connector. Power is only supplied once the peripheral sensor 20 detects that the peripheral 18 has been connected to the terminal 10 or is at least in such proximity that the peripheral sensor 20 detects the terminal sensor 22. This will be explained in further detail below.

The peripheral sensor 20 and the terminal sensor 22 are positioned such that upon connection of the peripheral 18 to the terminal 10, the peripheral sensor 20 can detect the terminal sensor 22 thereby detecting the connection of the peripheral 18 to the terminal 10. To reduce the de-plating of the contacts of the electrical connector 12 caused by conductive solution across the contacts 14 as a result of voltage on the connections, as outlined above, power may be cut-off from the connector 12 unless the presence of the peripheral 18 is detected by the peripheral sensor 20. This extends the life of the connector 12 and reduces the maintenance required on the terminal 10. Further, this reduces the risk of a spark being generated and increases the safety of the terminal, especially in hazardous environments.

The peripheral sensor 20 and the terminal sensor 22 may be passive sensors that do not require electrical power to operate and allow for detection of the terminal sensor 22 by the peripheral sensor 20. The peripheral sensor 20 requires power that may be provided by the terminal 10 to acknowledge detection of the terminal sensor 22 and optionally for waking the terminal 10. For example, the sensors 20 and 22 may be magnetic sensors that allow for magnetic detection of the terminal sensor 22 by the peripheral sensor 20. Alternatively, the sensors 20 and 22 may be hall effect sensors, read relays, capacitive sensors such as a suitable metal plate that allows for capacitive detection, a metal detector that resonates a coil, for example a tuned resonant circuit that is brought out of tune by a metal or magnetic source, and infrared (IR) sensor. If an IR sensor is used, an aperture with a window must be supplied reducing the ruggedness of the terminal 10 and the peripheral 18. For the purpose of this disclosure, the term passive sensor encompasses passive detectors. Detection methods include sensors operating using any of a light source, a magnetic source and a capacitive source.

By using passive sensors, the detection device may be used with unpowered peripherals. Such a device allows for power to be cut-off from the electrical connector 12 on the terminal 10 until the passive sensor 20 detects the presence of the peripheral 18 by detecting the terminal sensor 22. Upon detection of the peripheral 18, power can be sent to the electrical connector 12 and to the unpowered peripheral 18 thereby providing power to the unpowered peripheral 18 while reducing the de-plating of the contacts 14 of the electrical connector 12 when a peripheral is not connected to the terminal 10. A powered peripheral may alternatively be connected to the terminal 10 using passive sensors, however, powered sensors may be used in such an embodiment.

The sensors 20 and 22 may be adapted to survive various industry tests such as, for example, dropping of the peripheral or the terminal from various heights. In this regard, the sensors 20 and/or 22 may be set in a potting compound, for example but not limited to glue, so that the sensors 20 and/or 22 do not move around and vibration is reduced and protected against. A line of glue may be provided around the sensor 20 and/or 22.

Non limiting examples of various peripherals include bar code readers/scanners, a tethered (cable attached) peripheral, printer, thumb print reader or other biometric device, smart card reader, passport reader, memory card, a docking station, etc.

Figure 2:
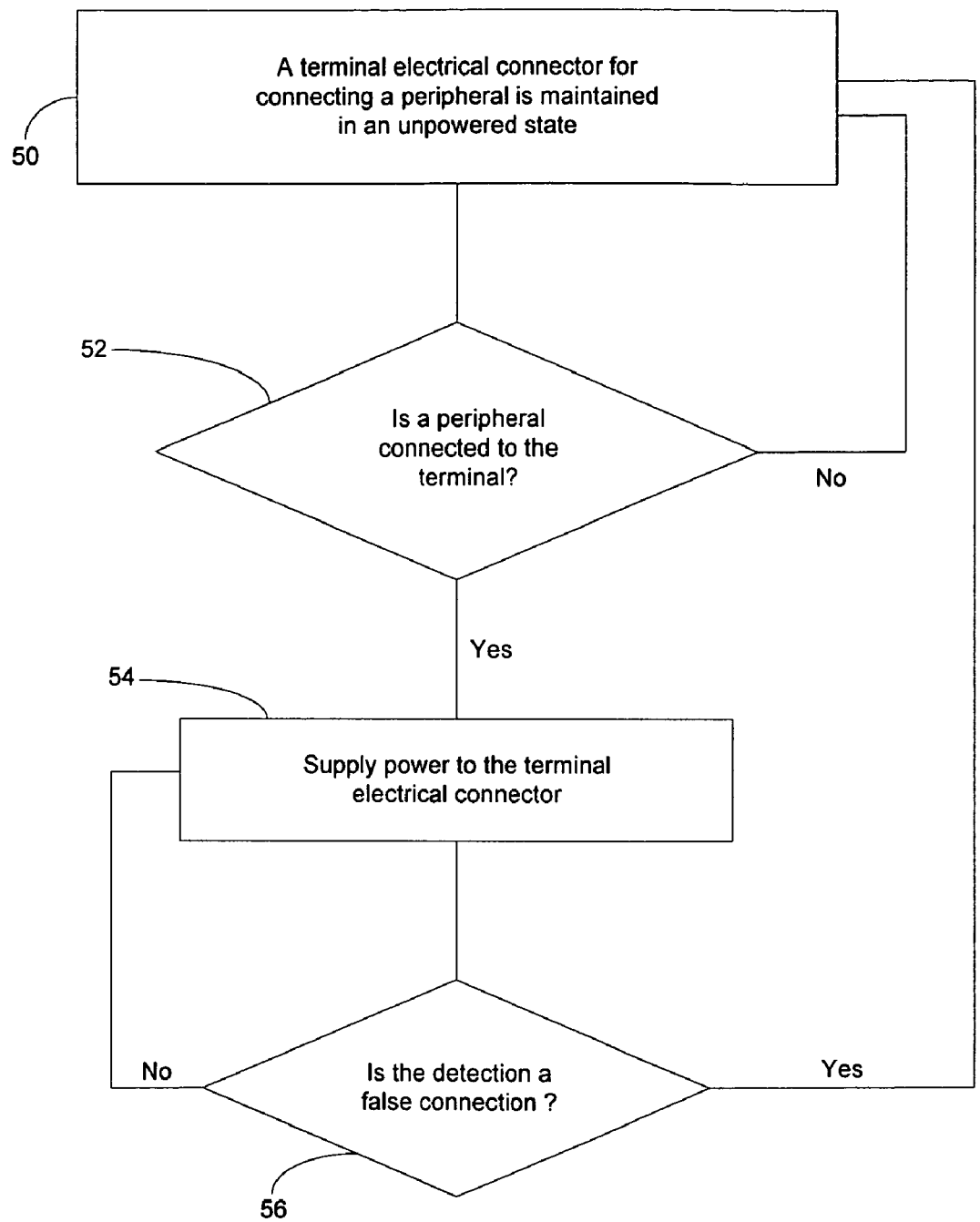
FIG. 2 is a flow chart of one illustrative method of reducing de-plating on an electrical connector.

A method of detecting a peripheral is illustrated in the flow chart shown in FIG. 2. In step 50 a terminal electrical connector for connection to a peripheral is maintained in an unpowered state. In step 52, a peripheral sensor connected to the terminal, detects if a terminal sensor connected to a peripheral is in proximity to the peripheral sensor and, if so, assumes that the peripheral is connected to the terminal electrical connector. If a peripheral is connected to the terminal electrical connector, in step 54 power is supplied to the terminal electrical connector for at least allowing communication between the peripheral and the terminal or charging a power source, such as but not limited to a battery, in the peripheral. If a peripheral is not detected, the method returns to step 50 and the electrical connector is maintained in an unpowered state.

Optionally, the peripheral sensor may detect a false connection in step 56, for example magnetic fields from a phone case that uses magnetic locks to keep it closed or capacitive detection of a false object too close. In such an event, if no response is received from a peripheral after a predetermined time, the connection times out and the method returns to step 50 and the terminal electrical connector is unpowered. It will be appreciated that the terminal may use any number of known methods for carrying out the timing of the response of the peripheral and that any predetermined time may be selected without departing from the scope of the invention.

The present invention has been described with regard to a plurality of illustrative embodiments. However, it will be apparent to persons skilled in the art that a number of variations and modifications can be made without departing from the scope of the invention as defined in the claims.

I claim:

1. A terminal comprising:
a terminal electrical connector for electrical connection with a peripheral electrical connector connected to a peripheral permitting at least one way communication between the terminal and the peripheral, the peripheral having a terminal sensor; and
a peripheral sensor being positioned on the terminal to sense the terminal sensor upon connection of the terminal electrical connector with the peripheral electrical connector and to enable the at least one way communication between the terminal and the peripheral when the peripheral sensor senses the terminal sensor.

2. The terminal of claim 1, wherein the at least one way communication comprises a supply of power from the terminal to the peripheral.

3. The terminal of claim 1, wherein the at least one way communication comprises data communication.

4. The terminal of claim 1, wherein the peripheral sensor is a passive sensor.

5. The terminal of claim 1, wherein the terminal sensor is a passive sensor.

6. The terminal of claim 1, wherein the sensors are one of magnetic sensors, hall effect sensors, read relays, capacitive sensors, metal detector sensors or infrared (IR) sensors.

7. The terminal of claim 1, wherein the peripheral is an unpowered peripheral.

8. A peripheral for use with a computer terminal, the peripheral comprising:

a peripheral electrical connector to engage a terminal electrical connector for at least one way communication with the computer terminal; and a terminal sensor located on the peripheral to activate a peripheral sensor on the computer terminal when the peripheral electrical connector engages the terminal electrical connector, wherein the peripheral operates only when the peripheral sensor on the computer terminal is activated.

9. The peripheral of claim 8, wherein the at least one way communication comprises a supply of power from the terminal to the peripheral.

10. The peripheral of claim 8, wherein the at least one way communication comprises data communication.

11. The peripheral of claim 8, wherein the terminal sensor is a passive sensor.

12. The peripheral of claim 8, wherein the peripheral sensor is a passive sensor.

13. The peripheral of claim 8, wherein the sensors are one of magnetic sensors, hall effect sensors, read relays, capacitive sensors, metal detector sensors or infrared (IR) sensors.

14. A system for detecting connection of a peripheral to a terminal, the system comprising:
   a terminal having:
      a terminal electrical connector for electrical connection with a peripheral electrical connector connected to peripheral permitting at least one way communication between the terminal and the peripheral, the peripheral having a terminal sensor; and
      a peripheral sensor being positioned on the terminal to sense the terminal sensor upon connection of the terminal electrical connector with the peripheral electrical connector and to enable the at least one way communication between the terminal and the peripheral when the peripheral sensor senses the terminal sensor,
   the peripheral having:
      the peripheral electrical connector connectable to the terminal electrical connector of the terminal; and
      the terminal sensor being sensed by the peripheral sensor on the terminal upon connection of the terminal electrical connector with the peripheral electrical connector.

15. The system of claim 14, wherein the at least one way communication comprises a supply of power from the terminal to the peripheral.

16. The system of claim 14, wherein the at least one way communication comprises data communication.

17. The system of claim 14, wherein the peripheral sensor is a passive sensor.

18. The system of claim 14, wherein the terminal sensor is a passive sensor.

19. The system of claim 14, wherein the sensors are one of magnetic sensors, hall effect sensors, read relays, capacitive sensors, metal detector sensors or infrared (IR) sensors.

20. The system of claim 14, wherein the peripheral is an unpowered peripheral.

* * * * *

UNITED STATES PATENT AND TRADEMARK OFFICE
CERTIFICATE OF CORRECTION

PATENT NO. : 8,074,007 B2
APPLICATION NO. : 12/987520
DATED : December 6, 2011
INVENTOR(S) : James It is certified that error appears in the above-identified patent and that said Letters Patent is hereby corrected as shown below:

In the Claims:

In Column 5, Line 27, in Claim 14, delete "peripheral" and insert -- a peripheral --, therefor.

Signed and Sealed this
Twenty-third Day of April, 2013

Teresa Stanek Rea
*Acting Director of the United States Patent and Trademark Office*